US012595158B2

(12) United States Patent
Mayadeen

(10) Patent No.: US 12,595,158 B2
(45) Date of Patent: Apr. 7, 2026

(54) LOAD-HANDLING DEVICE

(71) Applicant: Ocado Innovation Limited, Hatfield (GB)

(72) Inventor: Del Mayadeen, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 523 days.

(21) Appl. No.: 18/245,889

(22) PCT Filed: Sep. 17, 2021

(86) PCT No.: PCT/EP2021/075708
§ 371 (c)(1),
(2) Date: Mar. 17, 2023

(87) PCT Pub. No.: WO2022/058554
PCT Pub. Date: Mar. 24, 2022

(65) Prior Publication Data
US 2024/0010426 A1    Jan. 11, 2024

(30) Foreign Application Priority Data
Sep. 18, 2020    (GB) ..................................... 2014784

(51) Int. Cl.
*B65G 1/04*        (2006.01)
*B65G 1/06*        (2006.01)
(Continued)

(52) U.S. Cl.
CPC ................ *B66C 1/663* (2013.01); *B65G 1/04* (2013.01); *B65G 1/0464* (2013.01);
(Continued)

(58) Field of Classification Search
CPC ......... B66C 1/663; B66C 1/66; B65G 1/0464; B65G 1/04; B65G 1/0478; B65G 1/065; G06Q 10/087
See application file for complete search history.

(56) References Cited

U.S. PATENT DOCUMENTS 2,963,310 A * 12/1960 Abolins .................. B66C 1/663
410/82
3,498,665 A      3/1970 Karttunen
(Continued)

FOREIGN PATENT DOCUMENTS

AU      2014304360 A1      3/2016
AU      2018211338 A1      8/2018
(Continued)

OTHER PUBLICATIONS

International Search Report (PCT/ISA/210) with translation and Written Opinion (PCT/ISA/237) mailed on Nov. 22, 2021, by the European Patent Office as the International Searching Authority for International Application No. PCT/EP2021/075708. (16 pages).
(Continued)

*Primary Examiner* — Thomas Randazzo
(74) *Attorney, Agent, or Firm* — Buchanan Ingersoll & Rooney PC

(57)        ABSTRACT
A load-handling device for lifting and moving containers, the load-handling device including a body configured to house one or more operation components; a container-receiving space configured to accommodate at least part of a container; a container-engaging assembly configured to releasably engage a container; and a raising and lowering assembly configured to raise and lower the container-engaging assembly.

20 Claims, 6 Drawing Sheets

(51) Int. Cl.
    *B66C 1/66*         (2006.01)
    *G06Q 10/087*     (2023.01)

(52) U.S. Cl.
    CPC ........... *B65G 1/0478* (2013.01); *B65G 1/065*
                (2013.01); *B66C 1/66* (2013.01); *G06Q*
                                *10/087* (2013.01)

(56) References Cited

U.S. PATENT DOCUMENTS

| | | | | |
|---|---|---|---|---|
| 4,068,878 A * | 1/1978 | Wilner | ................... | B66C 1/663 |
| | | | | 29/559 |
| 5,137,115 A * | 8/1992 | Arnold | ................... | B66C 1/663 |
| | | | | 182/222 |
| 5,354,112 A | 10/1994 | Hara et al. | | |
| 5,560,663 A | 10/1996 | Hara et al. | | |
| 2003/0214143 A1 * | 11/2003 | Walker | .............. | B65D 90/0026 |
| | | | | 294/81.53 |
| 2008/0093869 A1 * | 4/2008 | Hay | ........................ | B60P 7/132 |
| | | | | 294/81.53 |
| 2016/0145058 A1 | 5/2016 | Lindbo | | |
| 2016/0194151 A1 | 7/2016 | Lindbo et al. | | |
| 2018/0086573 A1 | 3/2018 | Lindbo | | |
| 2018/0178980 A1 | 6/2018 | Lindbo et al. | | |
| 2018/0178981 A1 | 6/2018 | Lindbo et al. | | |
| 2020/0307908 A1 | 10/2020 | Lindbo et al. | | |
| 2021/0047111 A1 | 2/2021 | Lindbo et al. | | |
| 2021/0086992 A1 | 3/2021 | Lindbo et al. | | |
| 2021/0086993 A1 | 3/2021 | Lindbo et al. | | |

FOREIGN PATENT DOCUMENTS

| | | | | | |
|---|---|---|---|---|---|
| AU | 2018211341 A1 | 8/2018 | | | |
| AU | 2020223703 A1 | 9/2020 | | | |
| BR | 112016002773 A2 | 8/2017 | | | |
| CA | 2920669 A1 | 2/2015 | | | |
| CL | 2016000315 A1 | 8/2016 | | | |
| CN | 2086251 U | * | 10/1991 | ............. | B66C 1/28 |
| CN | 106414278 A | 2/2017 | | | |
| CN | 106365024 B | 4/2018 | | | |
| CN | 110371556 A | 10/2019 | | | |
| DE | 1756010 A1 | 3/1970 | | | |
| DE | 202014011467 U1 | 1/2021 | | | |
| DE | 202014011468 U1 | 1/2021 | | | |
| DK | 3030504 T3 | 5/2018 | | | |
| DK | 3299316 T3 | 1/2020 | | | |
| DK | 3293129 T3 | 2/2020 | | | |
| DK | 3556689 T3 | 10/2020 | | | |
| EA | 201690353 A1 | 7/2016 | | | |
| EA | 202092786 A1 | 5/2021 | | | |
| EP | 3003932 A1 | 4/2016 | | | |
| EP | 3030504 B1 | 2/2018 | | | |
| EP | 3293129 A1 | 3/2018 | | | |
| EP | 3299316 A1 | 3/2018 | | | |
| EP | 3556689 A1 | 10/2019 | | | |
| EP | 3632821 A1 | 4/2020 | | | |
| EP | 3795501 A1 | 3/2021 | | | |
| ES | 2666993 T3 | 5/2018 | | | |
| ES | 2766700 T3 | 6/2020 | | | |
| ES | 2774063 T3 | 7/2020 | | | |
| ES | 2825950 T3 | 5/2021 | | | |
| FI | 45850 B | 6/1972 | | | |
| FR | 1558152 A | 2/1969 | | | |
| GB | 1149338 A | 4/1969 | | | |
| GB | 2262273 A | 6/1993 | | | |
| GB | 2518259 A | 3/2015 | | | |
| GB | 2520104 A | 5/2015 | | | |
| HK | 132295 A | 9/1995 | | | |
| HR | P20201610 T1 | 1/2021 | | | |
| HU | E046971 T2 | 4/2020 | | | |
| HU | E051298 T2 | 3/2021 | | | |
| IL | 277260 A | 10/2020 | | | |
| IL | 243935 B | 2/2021 | | | |
| JP | 2016529181 A | 9/2016 | | | |
| JP | 6486927 B2 | 3/2019 | | | |
| JP | 2019116386 A | 7/2019 | | | |
| JP | 6728420 B2 | 7/2020 | | | |
| JP | 2020186133 A | 11/2020 | | | |
| KR | 20160040690 A | 4/2016 | | | |
| KR | 20210043757 A | 4/2021 | | | |
| NO | 3030504 T3 | 7/2018 | | | |
| NZ | 717311 A | 4/2020 | | | |
| NZ | 755559 A | 6/2020 | | | |
| NZ | 755560 A | 6/2020 | | | |
| NZ | 755562 A | 6/2020 | | | |
| PL | 3030504 T3 | 7/2018 | | | |
| PL | 3299316 T3 | 5/2020 | | | |
| PL | 3556689 T3 | 1/2021 | | | |
| PL | 3293129 T3 | 7/2021 | | | |
| PT | 3030504 T | 4/2018 | | | |
| PT | 3299316 T | 1/2020 | | | |
| PT | 3293129 T | 3/2020 | | | |
| PT | 3556689 T | 10/2020 | | | |
| SE | 327518 B | 8/1970 | | | |
| SG | 11201600949 W | 3/2016 | | | |
| WO | 2014195901 A1 | 12/2014 | | | |
| WO | 2015019055 A1 | 2/2015 | | | |

OTHER PUBLICATIONS

Search Report mailed on Jun. 21, 2021, by the United Kingdom Patent Office for Application No. GB2014784.9. (3 pages).

\* cited by examiner

1

31          31 z
y
x

LOAD-HANDLING DEVICE

The invention relates to a load-handling device including container-lifting means for lifting one or more containers.

BACKGROUND

The claimed apparatus, methods, systems and computer programs are intended to provide improvements relating to lifting containers, especially containers which are stored in stacked arrangements within a storage structure.

SUMMARY

According to an embodiment, there is provided a load-handling device as claimed in claim 1, a method as claimed in claim 8, a computer program as claimed in claim 11, and a system as claimed in claim 12. Optional features are set out in the dependent claims.

BRIEF DESCRIPTION OF THE DRAWINGS

The load-handling device will now be described in detail with reference to examples, in which.

DETAILED DESCRIPTION

The following embodiments represent the applicant's preferred examples of how to implement a load-handling device comprising container-lifting means, but they are not necessarily the only examples of how that could be achieved.

Figure 1:
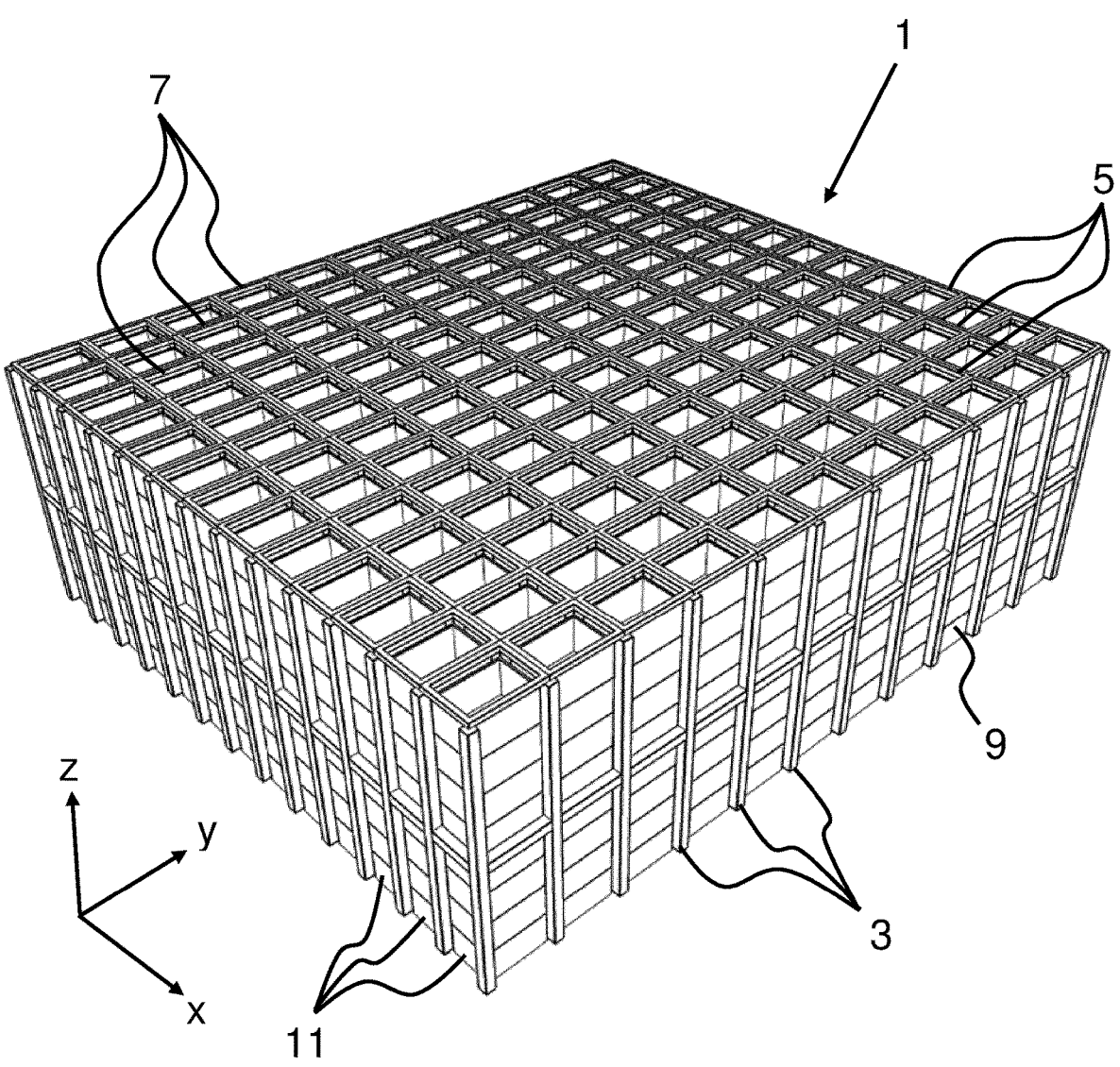
FIG. 1 schematically illustrates a storage structure and containers.

FIG. 1 illustrates a storage structure 1 comprising upright members 3 and horizontal members 5, 7 which are supported by the upright members 3. The horizontal members 5 extend parallel to one another and the illustrated x-axis. The horizontal members 7 extend parallel to one another and the illustrated y-axis, and transversely to the horizontal members 5. The upright members 3 extend parallel to one another and the illustrated z-axis, and transversely to the horizontal members 5, 7. The horizontal members 5, 7 form a grid pattern defining a plurality of grid cells. In the illustrated example, containers 9 are arranged in stacks 11 beneath the grid cells defined by the grid pattern, one stack 11 of containers 9 per grid cell.

Figure 2:
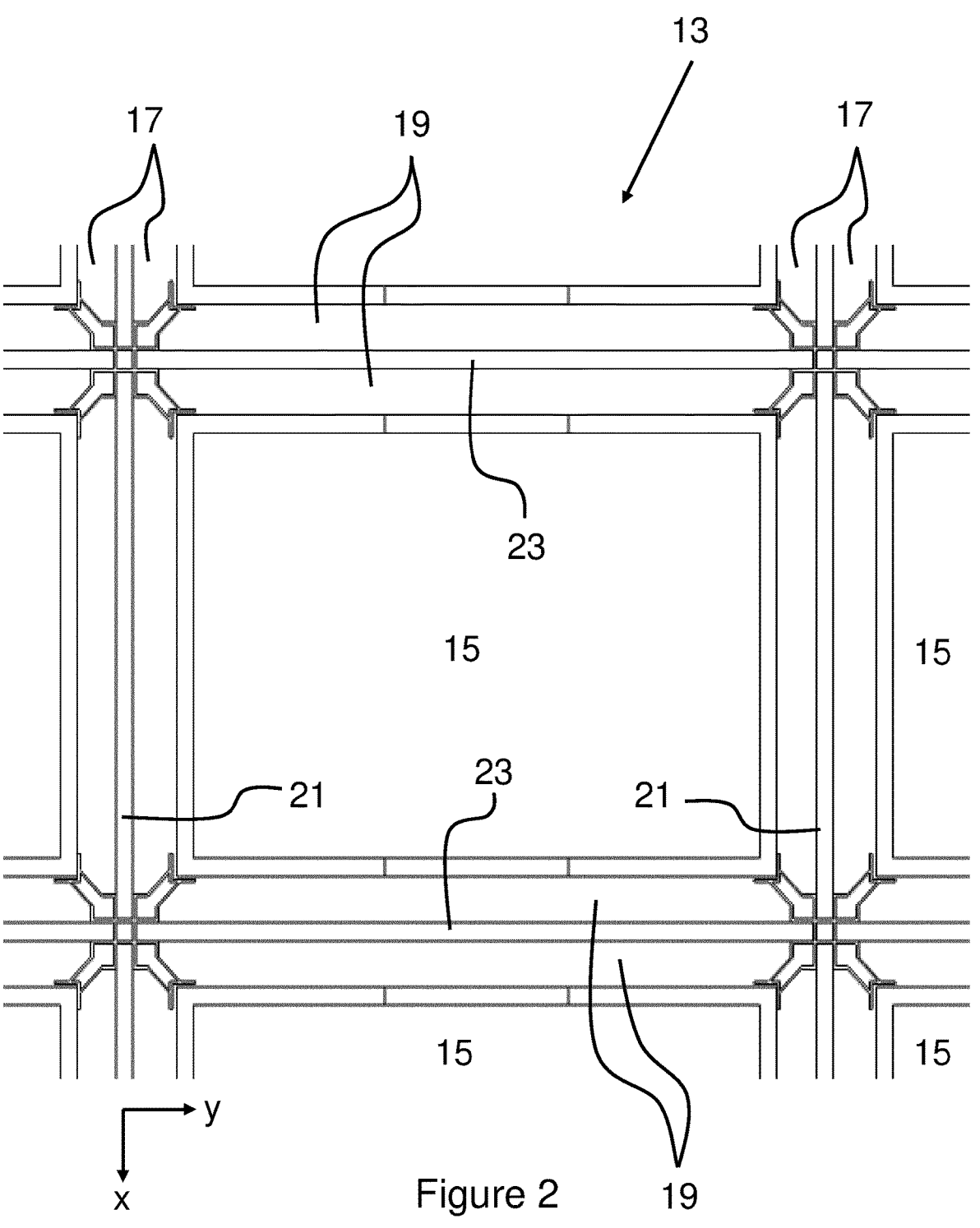
FIG. 2 schematically illustrates track on top of the storage structure illustrated in FIG. 1.

FIG. 2 shows a large-scale plan view of a section of track structure 13 forming part of the storage structure 1 illustrated in FIG. 1 and located on top of the horizontal members 5, 7 of the storage structure 1 illustrated in FIG. 1. The track structure 13 may be provided by the horizontal members 5, 7 themselves (e.g. formed in or on the surfaces of the horizontal members 5, 7) or by one or more additional components mounted on top of the horizontal members 5, 7.

The illustrated track structure 13 comprises x-direction tracks 17 and y-direction tracks 19, i.e. a first set of tracks 17 which extend in the x-direction and a second set of tracks 19 which extend in the y-direction, transverse to the tracks 17 in the first set of tracks 17. The tracks 17, 19 define apertures 15 at the centres of the grid cells. The apertures 15 are sized to allow containers 9 located beneath the grid cells to be lifted and lowered through the apertures 15. The x-direction tracks 17 are provided in pairs separated by channels 21, and the y-direction tracks 19 are provided in pairs separated by channels 23. Other arrangements of track structure may also be possible.

Figure 3:
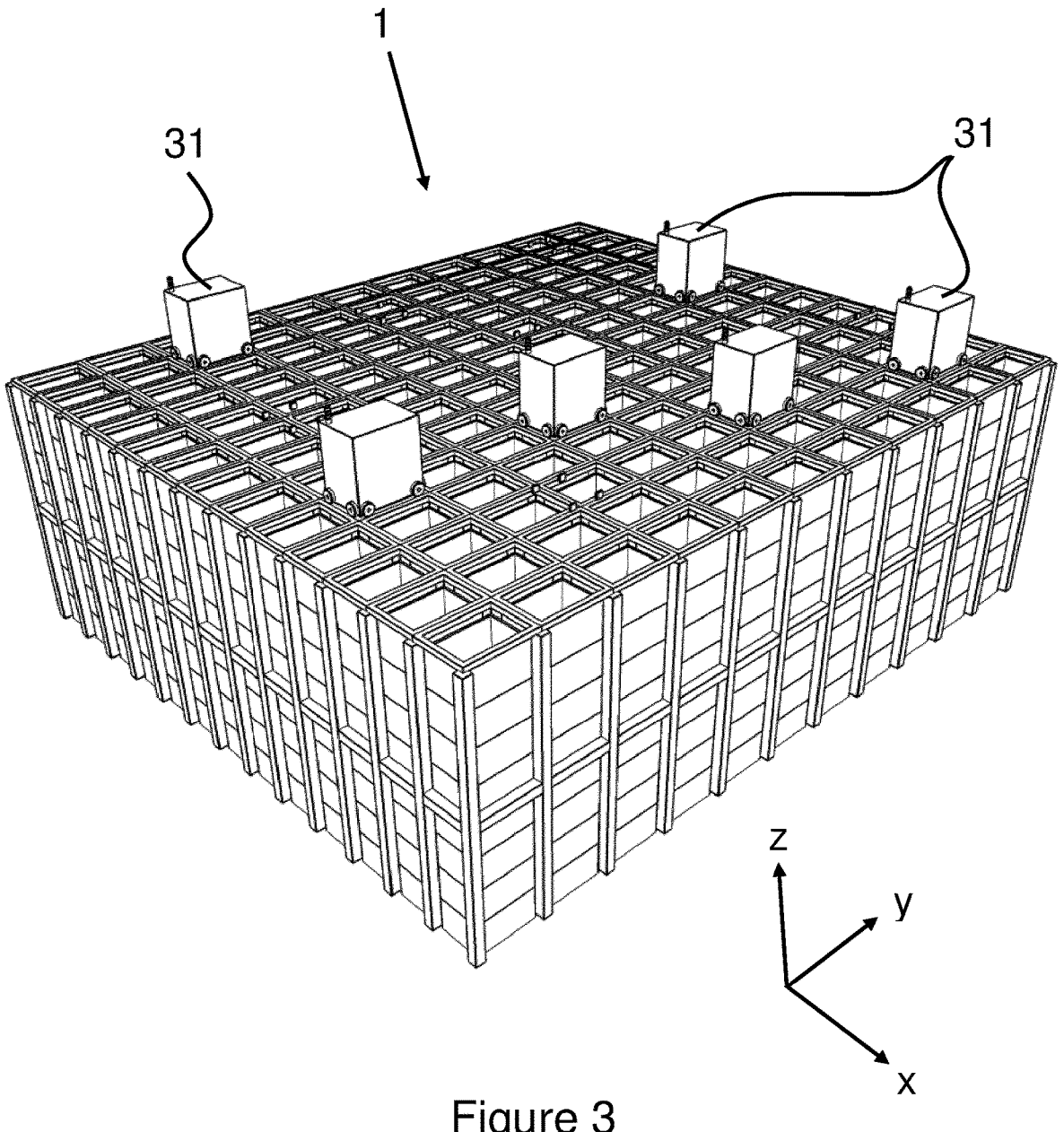
FIG. 3 schematically illustrates load-handling devices on top of the storage structure illustrated in FIG. 1.

FIG. 3 shows a plurality of load-handling devices 31 moving on top of the storage structure 1 illustrated in FIG. 1. The load-handling devices 31, which may also be referred to as robots 31 or bots 31, are provided with sets of wheels to engage with corresponding x- or y-direction tracks 17, 19 to enable the bots 31 to travel across the track structure 13 and reach specific grid cells. The illustrated pairs of tracks 17, 19 separated by channels 21, 23 allow bots 31 to occupy (or pass one another on) neighbouring grid cells without touching or colliding with one another.

Figure 4:
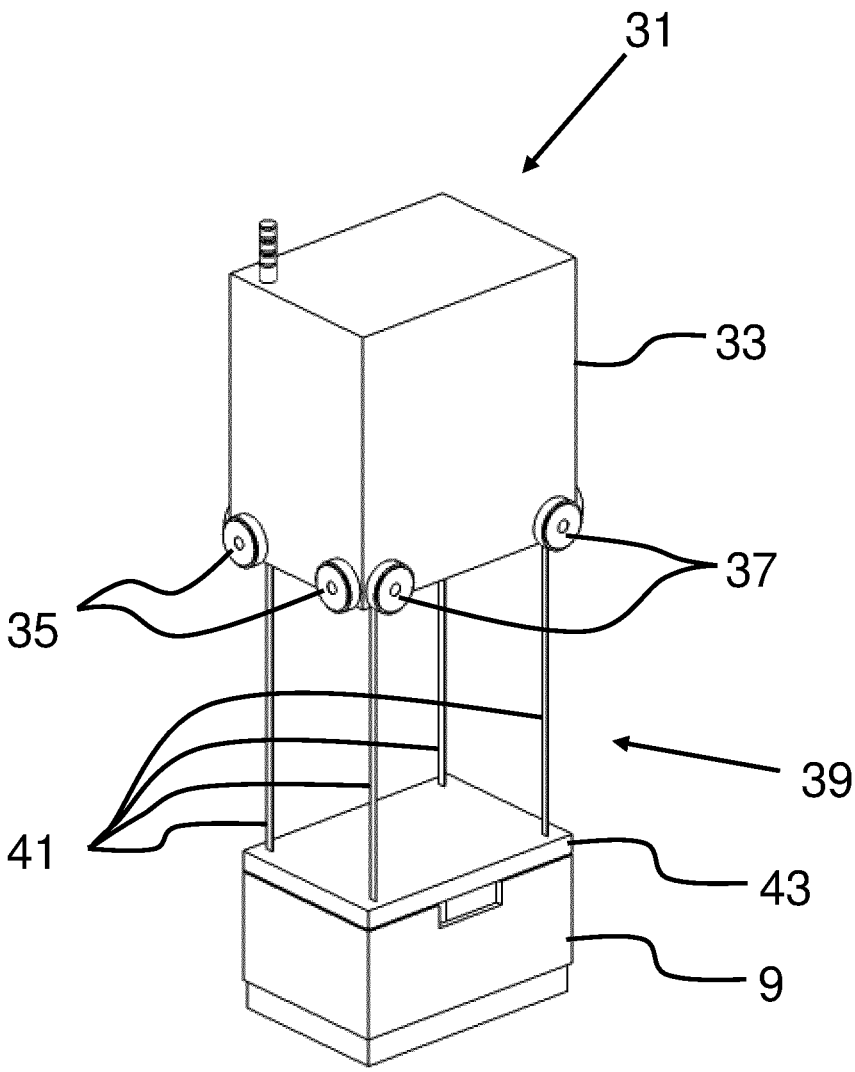
FIG. 4 schematically illustrates a single load-handling device with container-lifting means in a lowered configuration.

As illustrated in detail in FIG. 4, a bot 31 comprises a body 33 in or on which are mounted one or more components which enable the bot 31 to perform its intended functions. These functions may include moving across the storage structure 1 on the track structure 13 and raising or lowering containers 9 (e.g. from or to stacks 11) so that the bot 31 can retrieve or deposit containers 9 in specific locations defined by the grid pattern.

The illustrated bot 31 comprises first and second sets of wheels 35, 37 which are mounted on the body 33 of the bot 31 and enable the bot 31 to move in the x- and y-directions along the tracks 17 and 19, respectively. In particular, two wheels 35 are provided on the shorter side of the bot 31 visible in FIG. 4, and a further two wheels 35 are provided on the opposite shorter side of the bot 31 (side and further two wheels 35 not visible in FIG. 4). The wheels 35 engage with tracks 17 and are rotatably mounted on the body 33 of the bot 31 to allow the bot 31 to move along the tracks 17. Analogously, two wheels 37 are provided on the longer side of the bot 31 visible in FIG. 4, and a further two wheels 37 are provided on the opposite longer side of the bot 31 (side and further two wheels 37 not visible in FIG. 4). The wheels 37 engage with tracks 19 and are rotatably mounted on the body 33 of the bot 31 to allow the bot 31 to move along the tracks 19.

The bot 31 also comprises container-lifting means 39 configured to raise and lower containers 9. The illustrated container-lifting means 39 comprises four tapes or reels 41 which are connected at their lower ends to a container-engaging assembly 43. The container-engaging assembly 43 comprises engaging means (which may, for example, be provided at the corners of the assembly 43, in the vicinity of the tapes 41) configured to engage with features of the containers 9. For instance, the containers 9 may be provided with one or more apertures in their upper sides with which the engaging means can engage. Alternatively or additionally, the engaging means may be configured to hook under the rims or lips of the containers 9, and/or to clamp or grasp the containers 9. The tapes 41 may be wound up or down to raise or lower the container-engaging assembly, as required. One or more motors or other means may be provided to effect or control the winding up or down of the tapes 41. The tapes 41 and the one or more motors may together form a raising and lowering assembly configured to raise and lower the container-engaging assembly 43.

Figure 5:
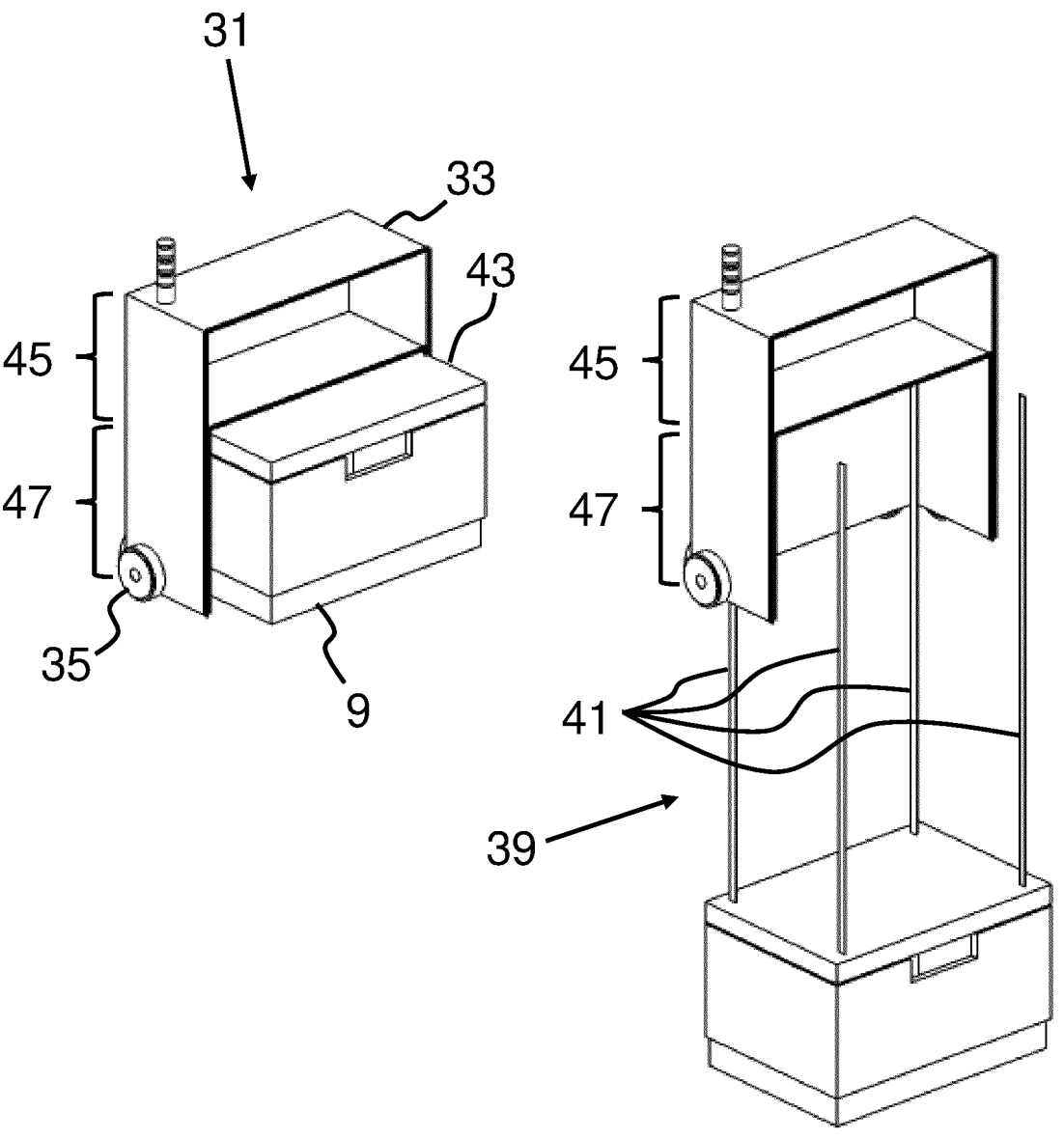
FIG. 5 schematically illustrates cutaway views of a single load-handling device with container-lifting means in a raised and a lowered configuration.

As can be seen in FIG. 5, the body 33 of the illustrated bot 31 has an upper portion 45 and a lower portion 47. The upper portion 45 is configured to house one or more operation components (not shown). The lower portion 47 is arranged beneath the upper portion 45. The lower portion 47 comprises a container-receiving space or cavity for accommodating at least part of a container 9 that has been raised by the container-lifting means 39. The container-receiving space is sized such that enough of a container 9 can fit inside the cavity to enable the bot 31 to move across the track structure 13 on top of storage structure 1 without the underside of the container 9 catching on the track structure 13 or another part of the storage structure 1. When the bot 31 has reached its intended destination, the container-lifting means 39 controls the tapes 41 to lower the container-gripping assembly 43 and the corresponding container 9 out of the cavity in the lower portion 47 and into the intended position. The intended position may be a stack 11 of containers 9 or an egress point of the storage structure 1 (or an ingress point of the storage structure 1 if the bot 31 has moved to collect a container 9 for storage in the storage structure 1). Although in the illustrated example the upper and lower portions 45, 47 are separated by a physical divider, in other embodiments, the upper and lower portions 45, 47 may not be physically divided by a specific component or part of the body 33 of the bot 31.

In some embodiments, the container-receiving space of the bot 31 may not be within the body 33 of the bot 31. For example, in some embodiments, the container-receiving space may be adjacent to the body 33 of the bot 31, e.g. in a cantilever arrangement with the weight of the body 33 of the bot 31 counterbalancing the weight of the container to be lifted. In such embodiments, a frame or arms of the container-lifting means 39 may protrude substantially horizontally from the body 33 of the bot 31, and the tapes/reels 41 may be arranged at respective locations on the protruding frame/arms and configured to be raised and lowered from those locations to raise and lower a container into the container-receiving space adjacent to the body 33. The height at which the frame/arms is/are mounted on and protrude(s) from the body 33 of the bot 31 may be chosen to provide a desired effect. For example, it may be preferable for the frame/arms to protrude at a high level on the body 33 of the bot 31 to allow a larger container (or a plurality of containers) to be raised into the container-receiving space beneath the frame/arms. Alternatively, the frame/arms may be arranged to protrude at a lower level on the body 33 (but still high enough to accommodate at least one container between the frame/arms and the track structure 13) to keep the centre of mass of the bot 31 lower when the bot 31 is loaded with a container.

To enable the bot 31 to move on the different wheels 35, 37 in the first and second directions, the bot 31 includes a wheel-positioning mechanism for selectively engaging either the first set of wheels 35 with the first set of tracks 17 or the second set of wheels 37 with the second set of tracks 19. The wheel-positioning mechanism is configured to raise and lower the first set of wheels 35 and/or the second set of wheels 37 relative to the body 33, thereby enabling the load-handling device 31 to selectively move in either the first direction or the second direction across the tracks 17, 19 of the storage structure 1.

The wheel-positioning mechanism may include one or more linear actuators, rotary components or other means for raising and lowering at least one set of wheels 35, 37 relative to the body 33 of the bot 31 to bring the at least one set of wheels 35, 37 out of and into contact with the tracks 17, 19.

In some examples, only one set of wheels is configured to be raised and lowered, and the act of lowering the one set of wheels may effectively lift the other set of wheels clear of the corresponding tracks while the act of raising the one set of wheels may effectively lower the other set of wheels into contact with the corresponding tracks. In other examples, both sets of wheels may be raised and lowered, advantageously meaning that the body 33 of the bot 31 stays substantially at the same height and therefore the weight of the body 33 and the components mounted thereon does not need to be lifted and lowered by the wheel-positioning mechanism.

Figure 6:
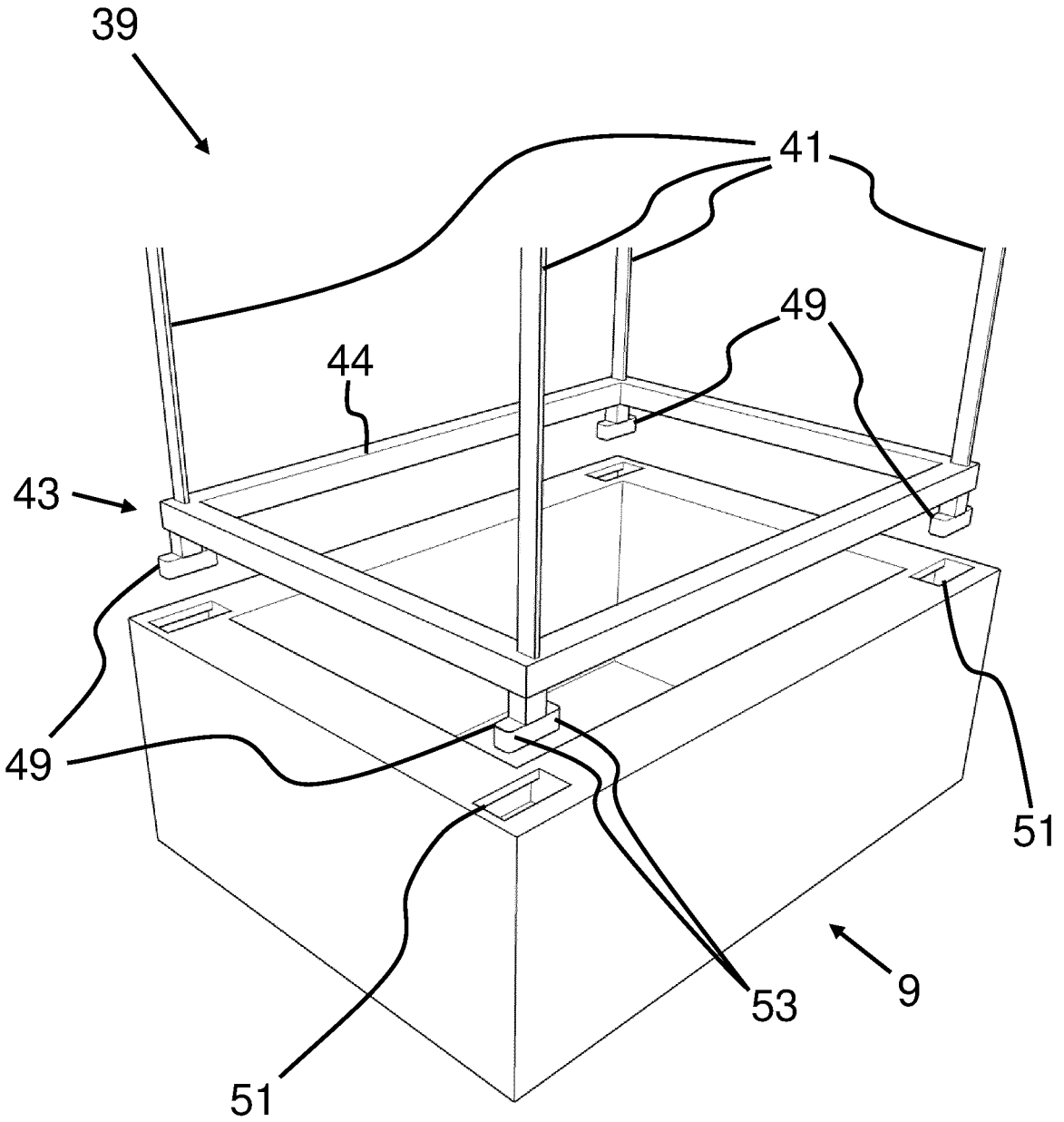
FIG. 6 schematically illustrates a container-engaging assembly of a load-handling device and a container.

FIG. 6 illustrates an example of container-lifting means in which the container-engaging assembly 43 comprises a frame 44 on which are mounted engaging means 49. The engaging means 49 are configured to engage with a container 9 in corresponding apertures 51 in the upper side of the container 9. The illustrated engaging means 49 comprise twist-locking connectors 49 which are configured to be rotated about respective axes extending approximately vertically (i.e. approximately parallel to the directions of extension of the respective tapes 41 and/or the z-direction) through the centres of the twist-locking connectors 49. Advantageously, being configured to rotate around approximately vertical axes may help to ensure that the twist-locking connectors 49 remain approximately horizontal (i.e. in the x-y plane) during use, such that the likelihood of a container 9 being disengaged from the twist-locking connector 49 is low.

The illustrated twist-locking connectors 49 are configured to rotate approximately 90° about their respective axes into an "engaging" or "locking" configuration in which they can lift and lower the container 9. More specifically, when the twist-locking connectors 49 have been lowered into the apertures 51 of the container 9, rotating the twist-locking connectors 49 through approximately 90° will allow upper surfaces of protruding end sections 53 of the twist-locking connectors 49 to engage with underside surfaces in the apertures 51 of the container 9. The container 9 may then be lifted by raising the tapes 41 and thus the container-engaging assembly 43 with the twist-locking connectors 49 and the container 9 they have engaged.

As shown in FIG. 6, a twist-locking connector 49 may have two protruding end sections 53, one on either side of the illustrated connector 49's axis of rotation. Such an arrangement with two protruding end sections 53 may advantageously spread the force applied between the twist-locking connector 49 and the container 9, thereby minimising potential damage to the twist-locking connector 49 and/or the container 9 through the mutual application of lifting/lowering force, and increasing the stability of the container 9 during lifting/lowering. Such an arrangement may also minimise torsion on the twist-locking connector 49 by allowing the force applied on either side of the axis of rotation to be balanced, thereby minimising risk that a connector 49 could be levered off the frame 44 by a pivoting action due to the container 9's weight.

In other embodiments, the twist-locking connector 49 may have a different number of protruding end sections, such as only one protruding end section 53 on one side of the respective axis of rotation. This may allow the twist-locking connector 49 and/or the aperture 51 to be made smaller. This may be advantageous for various reasons, such as reducing the total weight of the container-engaging assembly 43, increasing the strength of the container 9 (by allowing a smaller aperture 51 to be made in the container 9), and/or increasing the usable volume of the container 9 (again by allowing a smaller aperture 51, which impinges less on the central, open section of the container 9 for receiving goods).

In some embodiments, one or more features may be provided on the twist-locking connectors 49 and/or the container 9 to guide the twist-locking connectors 49 into the apertures 51 provided in the container 9. For example, a lower portion of the twist-locking connector 49 may be tapered, domed, bevelled or otherwise shaped to facilitate aligned entry of the connector 49 into the aperture 51. Additionally or alternatively, the aperture 51 may be shaped to facilitate aligned entry of the connector 49 into the aperture 51. For instance, the aperture 51 may have a tapered or countersunk entrance to guide the twist-locking connector 49 into the correct position to properly enter the aperture 51. In some examples, a spiral-shaped run-in groove to the aperture 51 may be provided in or on the container 9 to try to ensure that, if the twist-locking connector 49 approaches the container 9 in the wrong orientation (i.e. rotated to the "lifting" angle rather than the "entry" angle), the twist-locking connector 49 is guided by the spiral-shaped run-in groove into the correct orientation to enter the aperture 51.

Rotation of a twist-locking connector 49 (e.g. inside one of the illustrated apertures 51) may be driven by a motor, a rotary solenoid, a belt-drive or another suitable rotational drive means for causing the connector 49 to rotate through the desired angle. In some examples, a single motor or other drive mechanism may, via an appropriate linkage or linkages, drive rotation of two or more connectors 49 of a single container-engaging assembly 43. Alternatively, each connector 49 may have its own corresponding rotational drive means. The or each rotational drive means may be mounted on the frame 44 or provided elsewhere. For example, the or each rotational drive means may be mounted on the frame 44 and the (corresponding) twist-locking connector(s) 49 may be mounted on the (corresponding) rotational drive means. The illustrated twist-locking connectors 49 are advantageously symmetrical on rotation through 180°. This may mean that the rotational drive means need only rotate the twist-locking connector(s) 49 in one direction, as the twist-locking connector 49 can engage a container 9 on rotation through 90° and disengage the container 9 on rotation through a further 90° in the same direction, or on rotation through 90° in the opposite direction.

Advantageously, a container-engaging assembly comprising a twist-locking connector, such as the twist-locking connectors 49 illustrated in FIG. 6, may reduce the risk of unintended releasing of a container in the event of a power failure or other breakdown. In particular, the twist-locking connector may be arranged such that further positive action by the rotational drive means is required to disengage the twist-locking connector from the container (i.e. to move the connector from the "lifting/lowering" configuration to the "entry/exit" configuration). In the event of a power failure, such a positive action would not be providable by the rotational drive means. Moreover, the resistance or inertia provided by the rotational drive means may prevent inadvertent rotation of the twist-locking connector out of its engaged, lowering/lifting configuration.

A container-engaging assembly comprising a twist-locking connector may furthermore require relatively few components—especially moving components—to facilitate engagement with and disengagement from a container. It may therefore be lighter and faster, and require less power to operate, than other container-engaging assemblies.

Moreover, a container-engaging assembly comprising a twist-locking connector may experience less wear than other container-engaging assemblies, since the number of surfaces which experience relative movement, mutual application of force and the corresponding wear is reduced.

Although the illustrated twist-locking connectors 49 are rectangular in cross section, other shapes of twist-locking connector may also be used. For example, in some embodiments it may be advantageous for a twist-locking connector to be triangular, as a triangle may need less rotation (i.e. through an angle smaller than 90°) before the connector's corresponding protruding sections can engage with the underside surfaces in the corresponding aperture. A different shape of aperture may be provided if a different shape of twist-locking connector is used. Although the examples of rectangles and triangles have been given, other shapes may also be possible.

Although the illustrated twist-locking connectors 49 are configured to enter and rotate within corresponding apertures 51 in the upper sides of containers 9, in other embodiments a twist-locking connector may additionally or alternatively be configured to engage with another part of a container, such as an external lip of a container, e.g. a rim extending around the periphery of the container 9; a slot provided in a side wall of the container, into which a protruding section of a connector can rotate to engage with a suitable lifting surface; a base of the container 9; a different feature of the container 9; or a feature of a further component on which a container 9 rests (e.g. a platform).

Although the illustrated frame 44 is rectangular with an open central section (which may advantageously reduce the weight of the frame 44 and allow heavier containers to be lifted by the container-engaging means), other forms of frame may be provided, such as a closed, solid frame as illustrated in FIG. 5, an oval frame, or another shape. The shape of the frame may be chosen in dependence on the shape of the containers to be lifted.

In other embodiments, a container-engaging assembly may not include a frame. For example, in some embodiments, a twist-locking connector 49 may be attached directly (or via an intervening component specific to that connector 49) to a tape 41, or to a strut which is connected to two of the tapes 41 rather than a frame which is connected to all four tapes 41. Other structures may also be provided as part of a container-engaging assembly.

Although the illustrated twist-locking connectors 49 are configured to rotate about axes passing through the connectors' centres, in other examples, the axes of rotation may be offset from the connectors' centres. In some examples, a connector's axis of rotation may not pass through the connector at all. Such an arrangement may advantageously allow the corresponding twist-locking connector 49 to sweep through an arc with a wider radius, which may allow it to engage a container 9 at a greater distance.

In some embodiments, a dedicated rotation-inhibiting component may be provided to help ensure that a given twist-locking connector 49 is inhibited from rotating away from the "lifting/lowering" configuration to the "entry/exit" configuration (in which the twist-locking connector 49 can be inserted into or removed from an aperture 51 in a container 9). For example, an actuated or spring-loaded pin may be provided which is configured to inhibit movement of the connector 49 away from the "lifting/lowering" configuration. The pin may for example be mounted on or in the frame 44 or a component on which the connector 49 is mounted and may obstruct the connector 49 as the connector 49 tries to rotate away from the "lifting/lowering" configuration. The pin may only retract when a positive retraction force above a certain threshold is applied to the pin (e.g. by an actuator or by the connector 49 when a positive rotational force is applied to the connector 49 by the rotational drive means to overcome e.g. the spring-loading of the pin).

Although container-engaging means having twist-locking connectors are described above in the context of a moveable load-handling device which is configured to move across a storage structure 1 to collect containers and move them between different locations relative to the storage structure 1, container-engaging means using twist-locking connectors may also be provided in or on other load-handling devices. For example, a stationary load-handling device which is configured to lift and lower containers within a single column or multiple nearby columns of the storage structure 1 may be provided. Such a stationary load-handling device may for example be provided above one grid cell or part-way up a column of the storage structure 1, and may include container-engaging means as illustrated in FIG. 6 to enable containers to be lifted and lowered within the column(s) by the stationary lifting and lowering device. Additionally, a load-handling device which is configured to move containers into or out of the storage structure 1, e.g. from a port or a pick station where containers are deposited by a moveable or stationary load-handling device as described above, may also include container-engaging means having twist-locking connectors. Such a load-handling device may move containers between the storage structure 1 and a trolley, a delivery vehicle or another structure on which containers may be supported. Other load-handling devices which are configured to move containers may also be provided with container-engaging means having twist-locking connectors as illustrated in FIG. 6.

One or more controllers may be provided to control the actions of the load-handling device, including for example the movements of the load-handling device. For instance, one or more controllers may be provided to control the movements of the wheels 35, 37, and one or more controllers may be provided to control the movements of the container-engaging means 39 (including the motors or other raising and lowering means which control the raising and lowering of the container-engaging assembly 43 and the rotational driving means which control the rotation of the twist-locking connectors 49).

One or more sensors or other means for determining a separation between the container-engaging assembly 43 and a container 9 to be lifted may be provided as part of the load-handling device 31 to enable one of the above controllers to determine when to stop lowering the container-engaging assembly 43. The means may for example comprise an infrared, ultrasonic, laser, mechanical or other sensor for estimating a distance between the container-engaging assembly 43 and an obstacle in the path of the sensor, such as a container 9. Multiple sensors may be provided for this purpose, e.g. a first sensor to perform a first "rough" determination of the distance to the container 9 and a second sensor to perform a second, more accurate determination of the distance to the container 9. The second sensor may for example be configured to provide a more accurate measurement as the container-engaging assembly 43 approaches the container 9. Data from the sensors or other means may be provided to the one or more controllers above to enable the controller to control the raising and lowering of the container-engaging assembly 43, e.g. the speed of lowering of the container-engaging assembly 43. In some examples, one or more means may be provided for each corner of a frame 44 of the container-engaging assembly 43, to enable individual tapes 41 to be controlled individually.

It is envisaged that any one or more of the variations described in the foregoing paragraphs may be implemented in the same embodiment of a load-handling device.

In this document, the language "movement in the n-direction" (and related wording), where n is one of x, y and z, is intended to mean movement substantially along or parallel to the n-axis, in either direction (i.e. towards the positive end of the n-axis or towards the negative end of the n-axis).

In this document, the word "connect" and its derivatives are intended to include the possibilities of direct and indirection connection. For example, "x is connected to y" is intended to include the possibility that x is directly connected to y, with no intervening components, and the possibility that x is indirectly connected to y, with one or more intervening components. Where a direct connection is intended, the words "directly connected", "direct connection" or similar will be used. Similarly, the word "support" and its derivatives are intended to include the possibilities of direct and indirect contact. For example, "x supports y" is intended to include the possibility that x directly supports and directly contacts y, with no intervening components, and the possibility that x indirectly supports y, with one or more intervening components contacting x and/or y. The word "mount" and its derivatives are intended to include the possibility of direct and indirect mounting. For example, "x is mounted on y" is intended to include the possibility that x is directly mounted on y, with no intervening components, and the possibility that x is indirectly mounted on y, with one or more intervening components.

In this document, the word "comprise" and its derivatives are intended to have an inclusive rather than an exclusive meaning. For example, "x comprises y" is intended to include the possibilities that x includes one and only one y, multiple y's, or one or more y's and one or more other elements. Where an exclusive meaning is intended, the language "x is composed of y" will be used, meaning that x includes only y and nothing else.

In this document, "controller" is intended to include any apparatus which is suitable for controlling (e.g. providing instructions to) one or more other components. An example of a controller may comprise a processor equipped with one or more memories and appropriate software to process data relating to a component or components and send appropriate instructions to the component(s) to enable the component(s) to perform its/their intended function(s).

The invention claimed is:

1. A load-handling device for lifting and moving containers relative to a storage structure including a first set of tracks extending in a first direction and a second set of tracks extending in a second direction which is transverse to the first direction, the load-handling device comprising:
   a body configured to house one or more operation components;
   a container-receiving space configured to accommodate at least part of a container;
   container-lifting means including a container-engaging assembly including a twist-locking connector configured to releasably engage the container;
   a raising and lowering assembly configured to raise and lower the container-engaging assembly;
   rotational drive means configured to rotate the twist-locking connector between a lifting/lowering configuration and an entry/exit configuration; and
   a rotation-inhibiting component configured to inhibit rotation of the twist-locking connector away from the lifting/lowering configuration to the entry/exit configuration.

2. The load-handling device as claimed in claim 1, wherein the twist-locking connector comprises:

a surface configured to apply a lifting force to a corresponding surface of the container.

3. The load-handling device as claimed in claim 1, wherein the twist-locking connector is shaped to facilitate aligned entry of the connector into an aperture in the container.

4. The load-handling device as claimed in claim 1, wherein the container-engaging assembly comprises:

a frame on which the twist-locking connector is mounted.

5. The load-handling device as claimed in claim 1, comprising:

means for determining a separation between the container-engaging assembly and the container.

6. The load-handling device as claimed in claim 1, the load-handling device being configured to move on the tracks of a storage structure, the load-handling device comprising:

a first set of wheels configured to engage with a first set of tracks to guide movement of the load-handling device in the first direction;

a second set of wheels configured to engage with a second set of tracks to guide movement of the load-handling device in the second direction; and a wheel-positioning mechanism configured to selectively engage either the first set of wheels with the first set of tracks or the second set of wheels with the second set of tracks, the wheel-positioning mechanism being configured to raise and lower the first set of wheels and/or the second set of wheels relative to the body, thereby enabling the load-handling device to selectively move during operation in either the first direction or the second direction across the tracks of the storage structure.

7. The load handling device of claim 1 in a combination to form a system comprising:

the load-handling device; and a storage structure for accommodating the containers stacked in stacks, the storage structure including a first set of tracks extending in a first direction and a second set of tracks extending in a second direction which is transverse to the first direction, the load-handling device being configured to move on the tracks.

8. The load-handling device as claimed in claim 1, wherein the twist-locking connector is configured to be rotated about a substantially vertical axis.

9. The load-handling device as claimed in claim 8, wherein the twist-locking connector comprises:

a surface configured to apply a lifting force to a corresponding surface of the container.

10. The load-handling device as claimed in claim 9, wherein the twist-locking connector is shaped to facilitate aligned entry of the connector into an aperture in the container.

11. The load-handling device as claimed in claim 10, wherein the container-engaging assembly comprises:

a frame on which the twist-locking connector is mounted.

12. The load-handling device as claimed in claim 11, comprising:

means for determining a separation between the container-engaging assembly and the container.

13. The load-handling device as claimed in claim 12, the load-handling device being configured to move on the tracks of a storage structure, the load-handling device comprising:

a first set of wheels configured to engage with a first set of tracks to guide movement of the load-handling device in the first direction;

a second set of wheels configured to engage with a second set of tracks to guide movement of the load-handling device in the second direction; and a wheel-positioning mechanism configured to selectively engage either the first set of wheels with the first set of tracks or the second set of wheels with the second set of tracks, the wheel-positioning mechanism being configured to raise and lower the first set of wheels and/or the second set of wheels relative to the body, thereby enabling the load-handling device to selectively move during operation in either the first direction or the second direction across the tracks of the storage structure.

14. The load handling device of claim 13 in a combination to form a system comprising:

the load-handling device; and a storage structure for accommodating the containers stacked in stacks, the storage structure including a first set of tracks extending in a first direction and a second set of tracks extending in a second direction which is transverse to the first direction, the load-handling device being configured to move on the tracks.

15. A method for performance by a load-handling device for lifting and moving containers relative to a storage structure, the method comprising of:

lowering a container-engaging assembly of the load-handling device towards a container;

rotating a twist-locking connector of the container-engaging assembly to align a surface of the twist-locking connector with an opposing surface of the container; and raising the container-engaging assembly to lift the container.

16. The method as claimed in claim 15, comprising:

moving the load-handling device along tracks of the storage structure to move the container lifted from a first location of the storage structure to a second location of the storage structure.

17. The method as claimed in claim 15, performed by a computer program comprising instructions which, when the computer program is executed by a computer, cause the computer to carry out the lowering, the rotating and the raising.

18. The method as claimed in claim 15, comprising:

lowering the container-engaging assembly to lower the container; and rotating the twist-locking connector to move the surface of the twist-locking connector out of alignment with the opposing surface of the container.

19. The method as claimed in claim 18, comprising:

moving the load-handling device along tracks of the storage structure to move the container lifted from a first location of the storage structure to a second location of the storage structure.

20. The method as claimed in claim 19, performed by computer program comprising instructions which, when the computer program is executed by a computer, cause the computer to carry out the lowering, the rotating and the raising.

* * * * *